United States Patent [19]

Tendrup et al.

[11] Patent Number: 4,592,166
[45] Date of Patent: Jun. 3, 1986

[54] MULTIPLE SECTION HANGING PLANTER

[76] Inventors: Donald L. Tendrup, 32 DelMarie La., Nesconset, N.Y. 11767; Joseph P. Devito, 7 Ingrid Ct., Hauppauge, N.Y. 11729

[21] Appl. No.: 646,798

[22] Filed: Sep. 4, 1984

[51] Int. Cl.[4] ............................................. A01G 9/02
[52] U.S. Cl. ..................................................... 47/67
[58] Field of Search .................. 47/66, 67, 81, 82, 83; 220/408

[56] References Cited

U.S. PATENT DOCUMENTS 1,572,548  2/1926  Mattison .................................. 47/67
3,990,179 11/1976  Johnson et al. ......................... 47/67

Primary Examiner—Robert A. Hafer
Assistant Examiner—Danton DeMille
Attorney, Agent, or Firm—Bauer & Amer

[57] ABSTRACT

A planter formed of two sections, one disposed within the other, in which cooperating projections provided on the sections must slide over each other during the disassembly thereof, so that there is frictional resistance which obviates inadvertent disassembly of the planter.

2 Claims, 7 Drawing Figures

MULTIPLE SECTION HANGING PLANTER

The present invention relates generally to a hanging planter, and more particularly to a planter of this type formed of two sections in which there are improvements for enhancing the assembly of the sections, and then preventing the inadvertent disassembly thereof.

To achieve plant growth radially as well as vertically of the planter, and thus provide a noteworthy floral display which results from this multi-directional growth, the planter is made in two sections. Thus, after plants growing radially in a lower section are provided, an upper section is added thereon with vertically oriented or growing plants. Such a two- or multi-sectioned planter is described and illustrated in U.S. Pat. No. 3,990,179, which by this reference is incorporated herein in its entirety.

Since the planter is comprised of two sections which must readily assemble to each other, the prior art practice required maintaining size tolerances in the sections consistent with this objective, and also provided for simple interfitting structure on the sections to complete the engagement therebetween. However, any effort to avoid size variation increases manufacturing costs, and components which readily assemble with each other also have an undesirable tendency to inadvertently disassemble.

Broadly, it is an object of the present invention to provide a multi-section hanging planter of the general classification referred to, which is made to readily assemble and maintain its assembled condition, without precision made parts or otherwise subjected to increased manufacturing cost, and which overcomes the foregoing and other shortcomings of the prior art.

More particularly, it is an object to provide a planter in which there is appropriate flexibility in both the construction material and assumed shapes of the sections to readily achieve a friction snap fit therebetween, and to supplement this holding force with cooperating interacting structure which frictionally resists disassembling movement of one section from the other, so that inadvertent disassembly is obviated.

As already noted, and as exemplified by U.S. Pat. No. 3,990,179, what is involved herein is a multiple section hanging planter of the type having a lower section with notches providing side openings for the growth of plants therefrom extending radially of said planter through said side openings and an upper section in superposed relation on said lower section bounding an upper opening for the growth of additional plants therefrom extending vertically of said planter through said upper opening. The improvements to such planter demonstrating objects and advantages of the present invention includes said lower section being sized to extend upwardly beyond the side openings therein so as to bound a compartment above the radially extending plants. The upper section is then provided with an operative position disposed is this compartment incident to being assembled in superimposed relation on the lower section. During this assembly, a cooperating pair of projections on the upper and lower sections, which extend therefrom in opposite directions, assume relative locations thereon so that in the superposed assembled together condition of the sections, the projection on the upper section is below that of the lower section. As a result, disassembly of the sections requires movement of the lowermost projection past the other projection, to thereby contribute to preventing this disassembly from occuring inadvertently.

The above brief description, as well as further objects, features and advantages of the present invention, will be more fully appreciated by reference to the following detailed description of a presently preferred, but nonetheless illustrative embodiment in accordance with the present invention, when taken in conjunction with the accompanying drawings, wherein.

Figure 4:
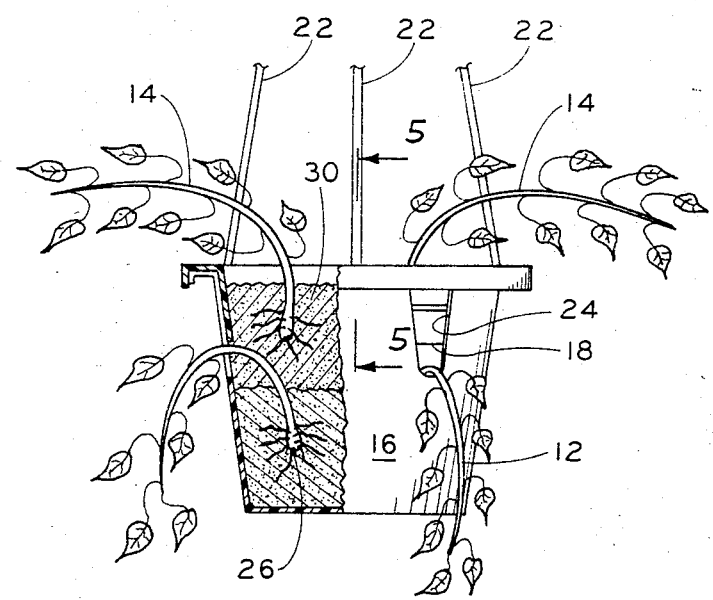
FIG. 4 is similarly a partially sectioned side elevational view of the planter, but of the two sections in their assembled condition.
Figure 5:
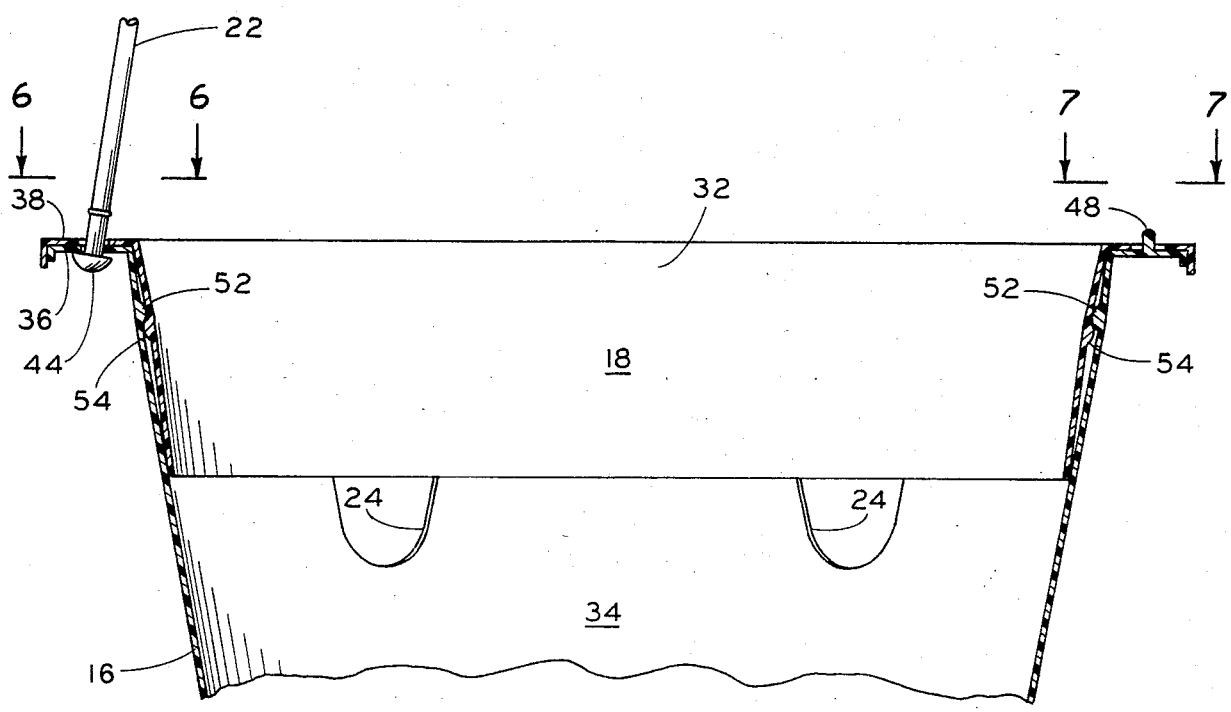
Figure 6:
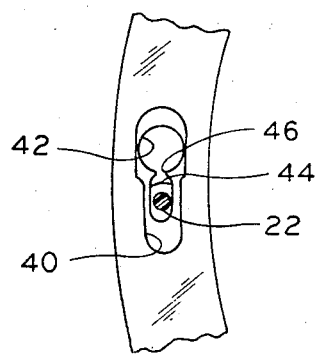
Figure 7:
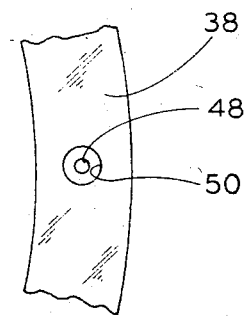

FIG. 5 is a partial sectional view, on an enlarged scale, as taken along line 5—5 of FIG. 4; and FIGS. 6 and 7 are partial plan views, respectively taken along lines 6—6 and 7—7 of FIG. 5.

The within improved planter, generally designated 10, is of the type illustrated and described in U.S. Pat. No. 3,990,179, in that it has provision for growing plants, individually and collectively designated 12, which extend radially of the planter, as well as for growing plants, individually and collectivley designated 14, which extend in a more conventional fashion vertically of the planter. Thus, the plants 12 and 14 combine to provide an enhanced floral display. As may be best and readily appreciated from FIG. 2, the plants 12 which extend laterally or radially of the planter 10 are the result of constructing the planter 10 with at least two sections, namely a bottom section 16 and a cooperating upper section 18, which two sections after being assembled in a manner which will soon be described in detail, are then suspended vertically by a hook 20 having depending stringers 22 which engage in a well understood manner the assembled sections 16 and 18.

Figure 1:
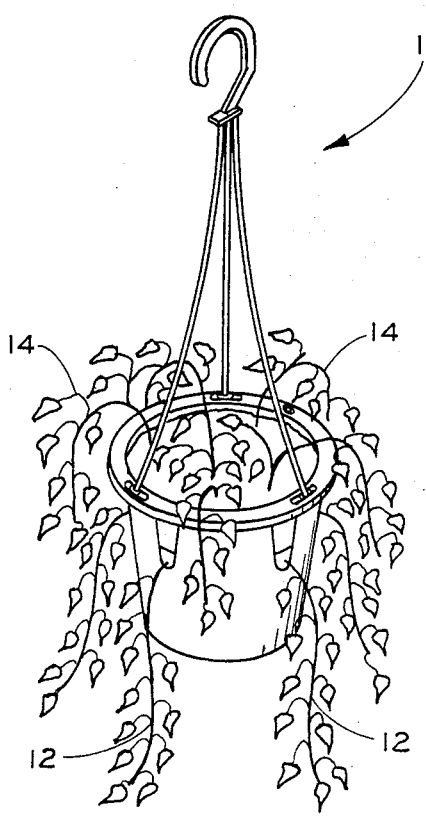
FIG. 1 is a perspective view of the within hanging planter.

More particularly, and as described in prior U.S. Pat. No. 3,990,179, the planter 10 hereof includes the lower section 16 primarily because it provides circumferentially spaced notches, individually and collectively designated 24, through which the plants 12 can extend from their rooted condition, as at 26, in an appropriate volume of earth 28, radially or laterally of the planter 10. To the plants 12 there are subsequently added the other previously noted plants 14, by adding an additional volume of earth 30 in the upper section 18, after it has been assembled to the lower section 16, to thereby achieve the floral display illustrated in perspective in FIG. 1 and in cross section in FIG. 4. A planter having this type of floral display, namely laterally extending or growing plants 12 and vertically extending or growing plants 14 is, as already acknowledged, already well known, and is exemplified by the planter of U.S. Pat. No. 3,990,179. Thus, what has been described thus far is part of the prior art and does not constitute the crux of the within invention.

Figure 2:
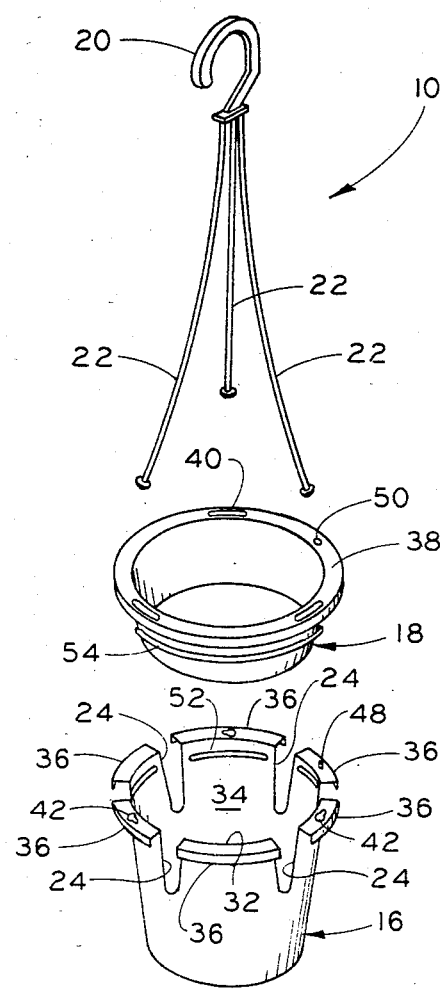
FIG. 2 is similarly a perspective view of the planter, which is formed of multiple sections, and which illustrates the planter in disassembled condition.
Figure 3:
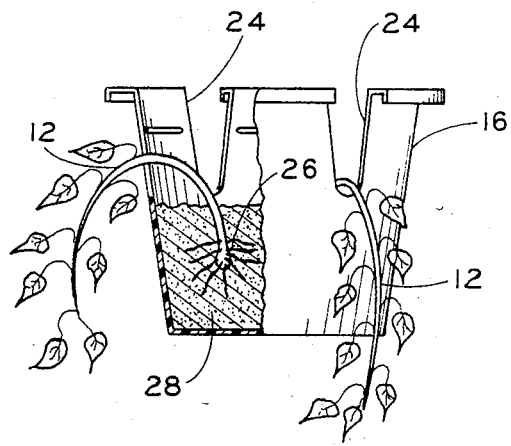
FIG. 3 is a side elevational view, partly in section illustrating details of the lower section of the planter.

Rather, the inventive contribution is more particularly illustrated in FIGS. 5, 6 and 7 supplementing the figures already described. More particularly, and as best shown in FIG. 2 in conjunction with FIGS. 5-7, the notches 24 of the lower section 16 extend approximately from the middle of this section upwardly to an upper edge 32, which upper edge bounds an upper compartment 34 of the section 16. From upper edge 32 there is a laterally extending lip formed as an integral part of section 16 which is comprised of sections, individually and collectively designated 36, which are interrupted at spaced locations occupied by the notches 24. At this point it should be noted that in practice the sections 16, as well as the other components of the planter 10, are fabricated of a pliable plastic so that due to the interruptions provided by the spaced notches 24 in the upper edge 32, and thus between the lip sections 36, it is readily possible to modify the circular shape of the opening 32, if and when it is necessary to do so. As the description proceeds, it will be explained when such a modification of the shape 32 is desirable.

Still referring to FIG. 2, it will be noted that the upper plant section 18 actually consists of a laterally extending lip 38, which, when the sections are assembled together, overlies the lip sections 36 of lower section 16, such that these lip sections 36 actually snap into place in a friction fit under the upper section lip 38. In this regard, the ability of the upper edge 32 to assume a modified shape, if need be, contributes to the lip sections 36 and lip 38 snapping together, even though there might be some variation in the diameters thereof.

Referring now to FIG. 5, it can be more readily noted that in the upper compartment 34 of section 16, the upper section 18 has an operative position disposed therein, so that as clearly illustrated in FIG. 5, the two sections 16 and 18 are in a concentric relation to each other about the upper opening 32 into the interior of the assembled sections 16, 18. Also, the cross sectional view of FIG. 5 illustrates how the lip sections 36 of section 16 snap in a friction fit beneath the lip 38 of section 18, said lips 36 and 38 being appropriately sized to achieve this engagement with each other, and that this engagement, as already noted, is enhanced by the pliability of the upper portion of section 16.

In the assembled condition of the two sections 16 and 18, circumferentially oriented shaped openings 40 in lip 38 and 42 in the lip sections 36 are adapted to align with each other and to receive therein the depending ends of the strings 22. More particularly, the notches 40 and 42 have a keyhole-type shape, the larger portion of which is large enough to allow the projection therethrough of grips 44 on the lower end of the strings 22, and the strings 22 are then moved circumferentially past a constriction 46 (see, in particular, FIG. 6) which define a remaining portion which is narrower than the head or grips 44 and thus results, in a well understood manner, in the heads or grips 44 providing support for the planter 10, and thus allowing for the vertical suspension thereof from the hook 20, which, in practice, is engaged to an elevated support.

To assist in aligning the openings 40 and 42, one of the lip sections 36 has small upstanding projections 48 (see FIG. 2 in conjunction with FIG. 7) which when the sections 16 and 18 are properly aligned extends through a small opening 50 in lip 38.

Reference should now be made specifically to FIG. 5 which best illustrates the improved manner in which inadvertent disassembly of the two sections 16 and 18 are obviated. More particularly, as illustrated in FIG. 5, as well as in FIG. 2, section 16 has an inwardly extending circular projection 52 formed intergrally thereon, while there is formed on upper section 18 a cooperating outwardly extending projection 54. The location of the projections 52 and 54 are selected so that in the assembled condition of the sections, as illustrated in FIG. 5, the outwardly extending projection 54 of section 18 is beneath that of the other projection 52. Thus, to remove section 18 from the compartment 34 of section 16, it is necessary to slide the projection 54 over and past the projection 52. The frictional resistance against this sliding movement is of an extent which does not prevent intentional disengagement of the sections 16 and 18, but is sufficient to obviate this from occuring inadvertently.

A latitude of modification, change and substitution is intended in the foregoing disclosure, and in some instances some features of the invention will be employed without a corresponding use of other features. Accordingly, it is appropriate that the appended claims be construed broadly and in a manner consistent with the spirit and scope of the invention herein.

What is claimed is:

1. In a multiple section hanging planter of the type having a lower section with notches providing side openings for the growth of plants therefrom extending radially of said planter through said side openings and an upper section in superposed relation on said lower section bounding an upper opening for the growth of additional plants therefrom extending vertically of said planter through said upper opening, the improvement to said planter comprising said lower section being formed with a wall that extends upwardly beyond said side openings therein so as to bound a compartment above said radially extending plants, and said upper section being formed with a wall that is disposed telescopically within said compartment when said upper section is assembled onto said lower section, said walls of said upper and lower sections overlapping each other and having thereon a cooperating pair of projections extending in opposite directions between said upper and lower sections, said projection on said upper section being below that of said lower section so that disassembly of said sections requires camming movement of said lowermost projection over said other projection against the weight of any earth used for said growth of plants being exerted radially against said overlapping walls of said upper and lower sections to thereby contribute to preventing said disassembly from occurring inadvertently, and on said lower section a horizontally extending lip bounding an opening and facing into said compartment, and said upper section being of pliable material and having an inverted downwardly facing U-shaped horizontally oriented lip bounding said upper opening, said U-shaped lip sized and of sufficient pliability so as to cooperatively snap in a friction fit over said lip of said lower section, to thereby contribute to further preventing inadvertent disassembly of said sections.

2. An improved planter as claimed in claim 1, wherein the construction material of said lower section is a pliable plastic and said side openings therein extend fully upwardly to said opening into said compartment to thereby provide an upper edge on said lower section which is interrupted by said side openings, whereby said lip on said lower section extending radially from said upper edge is readily modified in its shape so as to contribute to achieving said snap fit with said lip of said upper section.

* * * * *